Aug. 5, 1958  J. CRAGGS ET AL  2,846,051
APPARATUS FOR HANDLING CONVEYOR BELTING FOR
AN EXTENSIBLE CONVEYOR
Filed Dec. 20, 1956  2 Sheets-Sheet 1

INVENTOR.
Joseph Craggs
BY Keith McCann

Murray A. Gleeson
ATTORNEY

Aug. 5, 1958

J. CRAGGS ET AL 2,846,051

APPARATUS FOR HANDLING CONVEYOR BELTING FOR
AN EXTENSIBLE CONVEYOR

Filed Dec. 20, 1956

INVENTOR.
Joseph Craggs
Keith McCann

BY

*Murray A. Gleeson*

ATTORNEY

United States Patent Office 2,846,051
Patented Aug. 5, 1958

2,846,051

APPARATUS FOR HANDLING CONVEYOR BELTING FOR AN EXTENSIBLE CONVEYOR

Joseph Craggs and Keith McCann, Taylorville, Ill., assignors to Goodman Manufacturing Company, Chicago, Ill., a corporation of Illinois Application December 20, 1956, Serial No. 629,699

8 Claims. (Cl. 198—139)

This invention relates generally to extensible belt conveyors and more particularly to an improved construction in combination therewith for facilitating the placement of additional lengths of belting upon extension of the conveyor, or for ready removal of lengths of belting upon shortening of the conveyor.

One of the problems attendant upon the use of extensible belt conveyors has been that of placing or removing lengths of belt in accordance with the change in length of the conveyor. Each belt section may be stored upon a storage reel which must be brought into proximity to the conveyor when the conveyor is shortened or lengthened. In either operation the belt section is unwieldy and requires much manual effort in its handling.

According to the present invention an additional belt section is unwound from a storage reel mounted upon a mobile vehicle. The reel turns on a vertical axis, and the belt is threaded through a gate overlying the belt conveying reach of the conveyor. The gate has a vertical opening therein for holding the belt upright and rigid, and after being threaded through such opening, the belt is then twisted through 90° and joined at belt lacing to the belt already on the conveyor, the belt thereafter continuing to be payed off from the storage reel as the belt storage loops of the conveyor are extended. When sections of the belt are to be removed from the conveyor, the conveying reach is disconnected at a belt lacing and the section to be removed threaded in reverse direction through the gate and thence wound upon the storage reel, the belt storage loop of the conveyor shortening during such reverse process. Preferably, the storage reel is part of a self-propelled vehicle which is located in a cross entry or breakthrough closest to the head section of the conveyor, so that a minimal length of belt need be moved by the winch and motor at the head section controlling the belt storage loops.

The gate employed in the guiding of the to be added belt section is disposed in proximity to such breakthrough and storage reel, and is arranged to be swiveled to a position to one side of the conveyor to receive the start of the adidtional belt section, and then swiveled into position over the conveyor, the threaded belt section being then twisted through 90° and then laced or spliced to a section still on the conveyor.

With the foregoing considerations in mind it is a principal object of this invention to place and remove lengths of belting from an extensible conveyor in a more rapid manner than has been possible heretofore.

Another object is to provide a gate postioned to one side of an extensible conveyor arranged to receive threadably an additional section of conveyor belting, the gate being arranged to be swung into position over the conveyor whereby the belt section can be fed therethrough for subsequent splicing to the portion of the belt still remaining on the conveyor, the gate continuing to guide and feed the belt from the storage reel and on to the conveyor, and conversely feeding belt from the conveyor on to the storage reel when the conveyor is being shortened.

Other objects and important features of the invention will be apparent from the specification following taken with the drawings, which together describe and illustrate a preferred embodiment of the invention, and what is now considered to be the best mode of practicing the principles thereof. Other embodiments of the invention may be suggested to those having the benefit of the teachings herein and such other embodiments are intended to be reserved especially as they fall within the scope and spirit of the subjoined claims.

Figure 1:
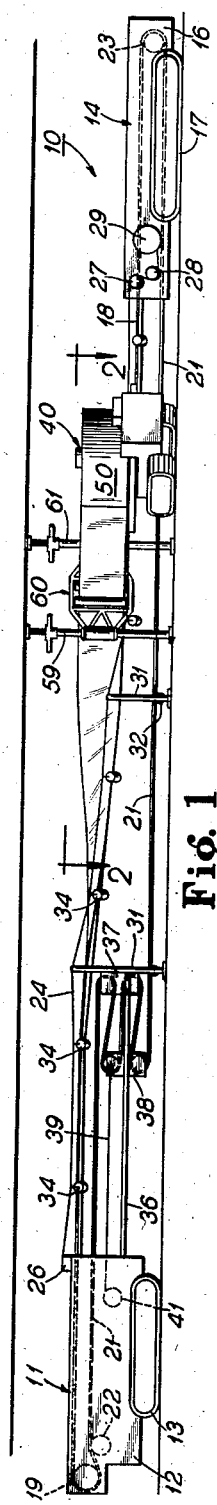
Fig. 1 is a side elevational view of an extensible conveyor, showing in position along side thereof a vehicle having a belt storage reel thereon, and showing means forming a part of the present invention in guiding an additional length of conveyor belting on to the extensible conveyor.

Referring now to Fig. 1 of the drawings, there is shown an extensible conveyor indicated generally by the reference numeral 10. Said conveyor includes a head or outby section 11 having side frames 12 mounted for movement upon crawler treads 13. The conveyor 10 also includes an inby or tail section 14 having a frame 16 mounted for movement upon crawler treads 17. The conveyor shown is of the endless belt type and includes a conveying reach 18 driven by a driving motor 19 at the head section 11 and a return reach 21 snubbed about a snubbing roller 22 at the head section 11. The endless belt is also reversed in direction about an idler pulley 23 located at the tail section 14.

The extensible conveyor shown is of the type which is supported upon a pair of laterally spaced wire ropes 24, 24. These are anchored at an abutment 26 to the head section 11, and the inby end of the cables 24 are snubbed about driving sheaves 27 and 28, additional lengths of the wire ropes being stored on a storage reel 29 on each side of the tail section 14.

The two strands 24, 24 are supported at intervals throughout their length by standards 31 having idler rollers 32 at the lower ends thereof for support of the return reach 21. The load on the conveying reach 18 is transferred into the rope strands 24 by means of troughing roller assemblies indicated generally by the reference numeral 34.

The head section 11 has extending therefrom a pair of laterally spaced rails 36 which are anchored at their inby ends to a standard 31 located inby of the head section 11. The spaced rails 36 afford a support for a fixed idler carriage 37 anchored to the rails 36, and a movable idler carriage 38 having a plurality of belt storage loops extending therebetween. The movable idler carriage 38 has a cable 39 connected thereto and wound upon a winch 41 maintaining a desired degree of tension in the conveying reach 18. As the conveyor is extended by movement of the tail section 14 in an inby direction, the wire rope support strands 24 are payed from the storage reels 29 and a desired amount of tension is maintained thereon by the snubbing rollers 27 and 28. Concurrently with such operation the belt storage loops maintained between the fixed idler carriage 37 and the movable idler carriage 38 are shortened. Details of construction of such a conveyor are as shown in our co-pending application, Serial No. 548,622, filed November 23, 1955 for Extensible Conveyor.

As the conveyor is lengthened in the manner described, the movable idler carriage 38 moves to a position adjacent the fixed idler carriage 37, and no further extensible movement can be had unless additional lengths of belting are supplied to the conveyor. It is to a construction whereby such lengths of belting may be added to the conveyor or removed therefrom in a more efficient manner than has been possible before that this invention is particularly directed.

Figure 2:
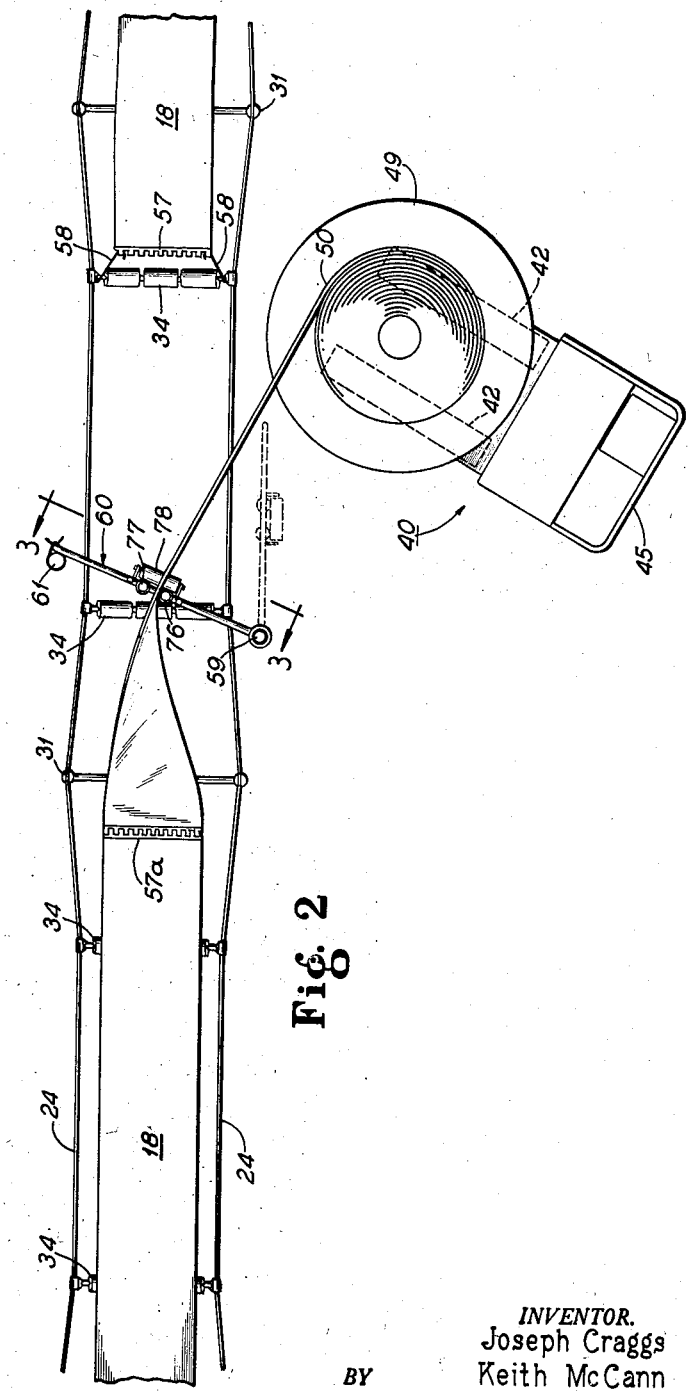
Fig. 2 is a plan view to an enlarged scale of a portion of the conveyor seen in Fig. 1, showing the storage reel vehicle and the gate cooperating therewith whereby lengths of belting can be added to the extensible conveyor or removed therefrom.
Figure 4:
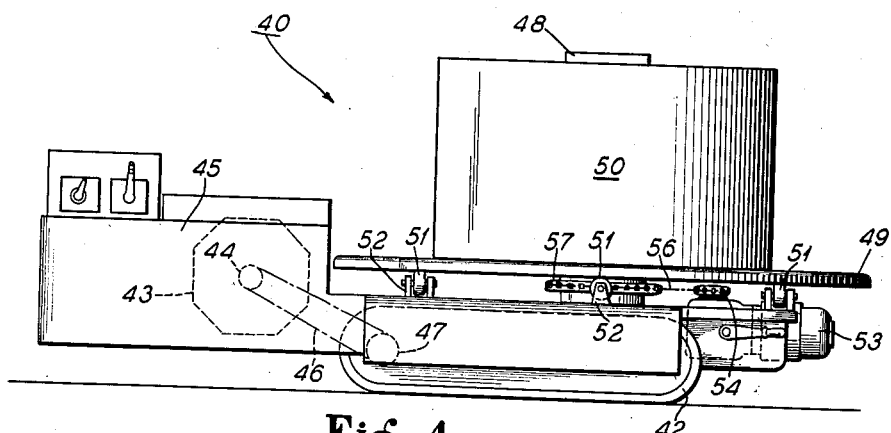
Fig. 4 is a side elevational view of the storage reel vehicle for supplying or removing lengths of belting from the conveyor seen in Fig. 1.

As seen particularly in Figs. 2 and 4, additional lengths of belting can be stored upon a storage reel vehicle referred to generally by the reference numeral 40. Such a vehicle includes a frame 45 mounted for movement upon crawler treads 42, the crawler treads being driven by a motor 43 having a driving sprocket 44 connected by a sprocket chain 46 to a driven sprocket 47 for the crawler treads 42.

A storage reel hub 48 for an additional length of belting 50 includes a base flange 49 which is supported upon rollers 51 mounted in brackets 52 extending upward from the frame 45. The storage reel hub 48 is driven to wind the belting thereon by means of a fluid motor 53 having a driving sprocket 54 and a driven sprocket 57 connected by a driving chain 56, all disposed below the base flange 49.

Details of mechanism for controlling the operation of the driving motor 43 and the fluid motor 53 are within the skill of one in the art and accordingly are not described in detail.

Referring again to Figs. 1 and 2 of the drawings when it is desired, for example, to introduce an additional length of belting to the extensible conveyor 10 the conveying reach 18 is opened at a belt lacing 57 thereof. The precise structure of such belt lacing forms no part of the present invention and any commercial form thereof may be employed. Upon such opening of the conveying reach 18, that portion of the belt inby of the lacing 57 will be hooked to a troughing roller assembly 34 nearest thereto. Such a hook is designated by the reference numeral 58.

The driving motor 19 at the head section 11 is then started to move that portion of the conveying reach to the left of the belt lacing 57, the direction of the conveying reach being the same as during operation of the conveyor 10. Such operation lessens the amount of tension in the belt storage loop between the fixed idler carriage 37 and the movable idler carriage 38, and since the winch 41 is controlled in its operation by the degree of tension obtaining, as described in our co-pending application, it will operate to move the movable idler carriage 38 to the left as seen in Fig. 1.

When the conveying reach 18 has separated as seen in Fig. 2, a new section 50 can be added thereto by apparatus as will now be described.

Figure 3:
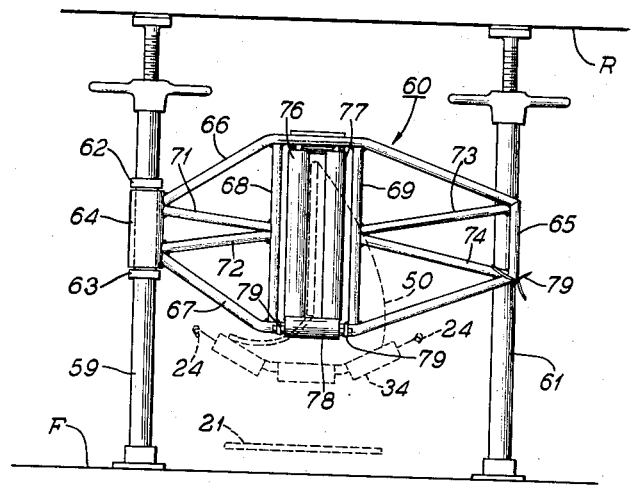
Fig. 3 is an elevational view looking in the direction of the arrows 3—3 of Fig. 2, showing details of the gate for guiding the supply of conveyor belting.

Referring now also to Fig. 3, the belt conveyor 10 is flanked by a pair of jacks 59 and 61 which extend between the mine floor F and the mine roof R. The jack 59 affords a means of swinging support for a gate indicated generally by the reference numeral 60 adapted to swing into position over the conveyor 10 as seen in Figs. 2 and 3. The jack 59 has a pair of spaced collars 62 and 63 thereon supporting and guiding a sleeve 64. The gate 60 extending therefrom consists of an upper frame member 66 and a lower frame member 67, which extend across the conveyor 10 in abutting relationship with the opposite jack 61, being joined together at the jack 61 by a vertical end member 65. The upper and lower frame members 66 and 67 are spanned by vertical members 68 and 69, and additional stiffening members 71 and 72 extend in the plane of the upper and lower frame members 66 and 67 from the sleeve 64 to the vertical member 68. Additional stiffening members 73 and 74 likewise extend from the other vertical member 69 to a point of juncture with the ends of the upper members 66 and the lower members 67 at the vertical end member 65.

The upper and lower frame members 66 and 67 afford a means of support for vertically extending spaced rollers 76 and 77 between which the belt section 50 may be guided. The lower edge of the belt section 50 is supported upon a horizontal roller 78 mounted at each end in brackets 79 extending from the lower frame member 67.

After the belt conveying reach 18 has been opened and the belt lacing 57 thereof moved apart as seen in Fig. 2, the gate 60 can be moved to the dotted line position seen in Fig. 2, and a portion of the length of belt 50 stored on the vehicle 40 can be threaded through the opening between the side by side vertical rollers 76 and 77 seen in Fig. 3. Thereupon the gate 60 can be swung to the full line position seen in Fig. 2. When swung to said position, the gate can be locked to the jack 61 by any convenient means, or tied thereto by the tie 79 in the manner seen. The length of belt thus threaded through the gate 60 in the manner described is thereafter twisted through 90° and relaced as at 57a. The motor 19 is then restarted, and the operation of the winch 41 is such as to move the movable idler carriage 38 to the left to extend the belt storage loops, the belt section 50 being paid from the reel 48 of the vehicle 40 during such time. It may be noted that the belt section 50 can freely unwind from reel 48 at this time.

When the belt section 50 is completely payed out from reel 48 and laid upon the conveyor the gate 60 can be swung to the dotted line position again, the trailing end of the belt section 50 being no longer threaded through the gate 60, and being relaced at the lacing 57.

When the conveyor is to be shortened the reverse set of operations takes place. The lacing is disconnected as at 57 as before, and the section of belt to be removed is threaded through the gate 60 and wound upon the storage vehicle 40. The fluid motor 53 thereof drives the storage reel 48 and imposes tension upon the section to be removed. At the start of such removal of a belt section the belt storage loops have their greatest length, with the movable idler carriage closest to the outby section 11. As before, the portion of the belt extending to the inby section 14 is hooked to a troughing roller assembly 34 as seen in Fig. 2.

The storage reel vehicle 40 can be moved at the situs of the conveyor, and so arranged that the belt lacing 57a can be brought into position to the belt lacing 57, after which time the gate 60 can be moved to the dotted line position shown, disengaged from the conveyor belt. At such time, of course, the belt storage loops will have their shortest length, and when a new connection is effected at the lacings 57 and 57a, the conveyor can be reoperated at its shorter length, or the further shortening thereof can be accomplished by moving the tail section 14 toward the head section 11, at which time the wire rope strands will be wound upon the storage reels 29 of the tail section 14, the belt storage loops at the head section 11 lengthening during such shortening movement of the conveyor. At the conclusion of such inby movement of the tail section 14 and the lengthening of the storage loops, as described, the conveyor 10 is ready once more for another shortening operation.

It will be appreciated by one skilled in the art that such shortening movement of the conveyor entails the removal of troughing roller assemblies 34 and support strands 31 in proximity to the tail section 14.

It will thus be seen that structure according to the present invention enables an extensible conveyor to be shortened or lengthened readily and that such operations can be effected with a minimum of manual effort on the part of the operators. The gate 60 is preferably disposed at a breakthrough of the rib closest to the outby or head section 11, and the storage reel vehicle 40 is disposed in proximity thereat. Other storage reels can be placed on the storage reel vehicle 40 for receiving sections of belt 50 removed from the conveyor or to supply lengths for extension of the conveyor as needed.

While the invention has been described in terms of a preferred embodiment its scope is intended to be limited only by the claims here appended.

We claim as our invention:

1. The combination with an extensible conveyor of apparatus of the class described including belt storage means having a storage reel thereon and including a guide for effecting transfer of a conveyor belt section between said conveyor and said belt storage means, said guide including a pair of vertical members disposed one each side of said conveyor including means for supporting said guide for swiveling movement from one of said vertical members, means on said guide through which said section may be threaded while extending in a vertical plane comprising a pair of closely spaced vertically extending rollers, and means on said guide for supporting said section along the lower edge thereof while being so guided comprising a horizontally extending roller.

2. The combination with an extensible conveyor of apparatus of the class described including belt storage means having a storage reel thereon and including a guide for effecting transfer of a conveyor belt section between said conveyor and said belt storage means, said guide including a pair of vertical members disposed one each side of said conveyor including means for supporting said guide for swiveling movement from one of said vertical members, means on said guide through which said section may be threaded while extending in a vertical plane, and means on said guide for supporting said section along the lower edge thereof while being so guided comprising a horizontally extending roller.

3. The combination with an extensible conveyor of apparatus of the class described including belt storage means having a storage reel thereon and including a guide for effecting transfer of a conveyor belt section between said conveyor and said belt storage means, said guide including a pair of vertical members disposed one each side of said conveyor including means for supporting said guide for swiveling movement from one of said vertical members, means on said guide through which said section may be threaded while extending in a vertical plane comprising a pair of closely spaced vertically extending rollers, and means on said guide for supporting said section along the lower edge thereof while being so guided.

4. The combination with an extensible conveyor of apparatus of the class described including belt storage means having a storage reel thereon and including a guide for effecting transfer of a conveyor belt section between said conveyor and said belt storage means, said guide including a pair of vertical members disposed one each side of said conveyor including means for supporting said guide for swiveling movement from one of said vertical members, means on said guide through which said section may be threaded while extending in a vertical plane, and means on said guide for supporting said section along the lower edge thereof while being so guided.

5. The combination with an extensible conveyor of apparatus of the class described including belt storage means and a guide for effecting transfer of a conveyor belt section between said conveyor and said belt storage means, said guide including a vertical member disposed to one side of said conveyor including means for supporting said guide for swiveling movement from said vertical member, means on said guide through which said section may be threaded while extending in a vertical plane comprising a pair of closely spaced vertically extending rollers, and means on said guide for supporting said section along the lower edge thereof while being so guided comprising a horizontally extending roller.

6. The combination with an extensible conveyor of apparatus of the class described including belt storage means and a guide for effecting transfer of a conveyor belt section between said conveyor and said belt storage means, said guide including a vertical member disposed to one side of said conveyor including means for supporting said guide for swiveling movement from said vertical member, means on said guide through which said section may be threaded while extending in a vertical plane, and means on said guide for supporting said section along the lower edge thereof while being so guided comprising a horizontally extending roller.

7. The combination with an extensible conveyor of apparatus of the class described including belt storage means and a guide for effecting transfer of a conveyor belt section between said conveyor and said belt storage means, said guide including a vertical member disposed to one side of said conveyor including means for supporting said guide for swiveling movement from said vertical member, means on said guide through which said section may be threaded while extending in a vertical plane comprising a pair of closely spaced vertically extending rollers, and means on said guide for supporting said section along the lower edge thereof while being so guided.

8. The combination with an extensible conveyor of apparatus of the class described including belt storage means and a guide for effecting transfer of a conveyor belt section between said conveyor and said belt storage means, said guide including a vertical member disposed to one side of said conveyor including means for supporting said guide for swiveling movement from said vertical member, means on said guide through which said section may be threaded while extending in a vertical plane, and means on said guide for supporting said section along the lower edge thereof while being so guided.

References Cited in the file of this patent

UNITED STATES PATENTS 2,733,806     Lanier, Jr. _____ Feb. 7, 1956